UNITED STATES PATENT OFFICE.

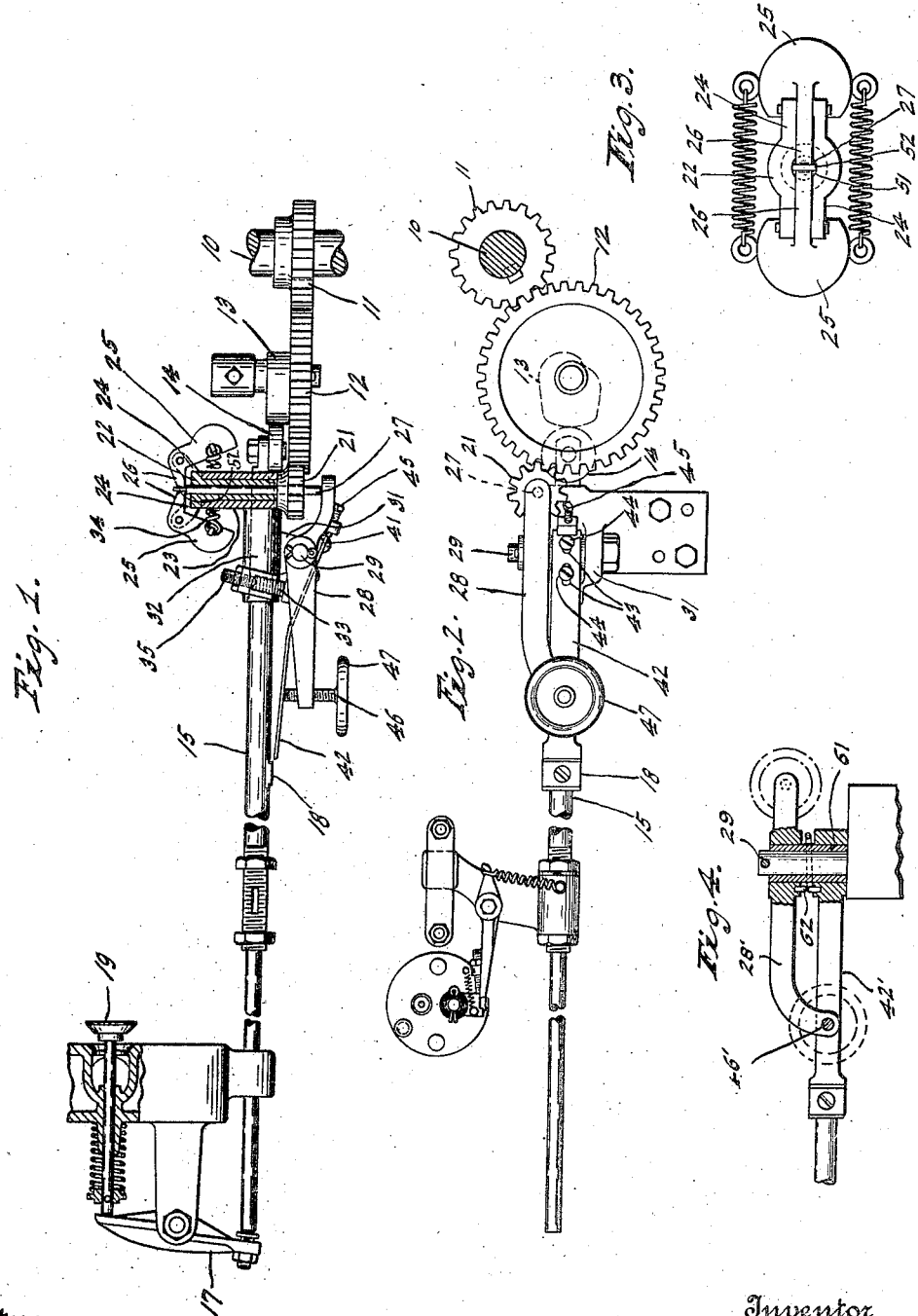

MILTON O. REEVES, OF COLUMBUS, INDIANA.

GOVERNOR FOR GAS-ENGINE VALVE-GEARS.

1,047,290.    Specification of Letters Patent.    Patented Dec. 17, 1912.

Application filed March 11, 1912. Serial No. 683,138.

*To all whom it may concern:*

Be it known that I, MILTON O. REEVES, a citizen of the United States, residing at Columbus, in the county of Bartholomew and State of Indiana, have invented a new and useful Governor for Gas-Engine Valve-Gears, of which the following is a specification.

The object of my invention is to produce a simple device by means of which the governing speed of an internal combustion engine may be readily varied, the primary object of my invention being to provide an apparatus which is readily understandable and operable by persons who are not skilled mechanics.

The accompanying drawings illustrate my invention.

Figure 1 is a fragmentary plan in partial horizontal section of a valve operating and adjacent parts, equipped with my improved adjustable governing mechanism; Fig. 2 is a side elevation of most of the parts shown in Fig. 1, and showing also the usual spark plug mechanism; Fig. 3 a detail of the governor; and Fig. 4 a sectional detail of a modification.

In the drawings, 10 indicates the crank shaft of an internal combustion engine provided with a gear 11 which meshes with a gear 12 carrying the usual valve-operating cam 13, said operating cam acting in the usual manner upon a roller 14 carried by a reciprocable valve stem 15 which engages a valve-operating lever 17. Stem 15 is provided with a catch block 18 of usual form arranged to be engaged by a retaining finger for limited periods of time in such position as to hold the exhaust valve 19 open irrespective of the rotation of cam 13.

Geared to gear 12 is a pinion 21 which is attached to a sleeve 22 journaled in a bearing 23. The sleeve 22 carries two pairs of oppositely arranged arms 24, 24 to each pair of which is pivoted a governor ball 25, the inner arms 26 of which rest upon the end of a pin 27 which passes axially through sleeve 22 and engages at its projected end with one arm of a lever 28 pivoted at 29 upon a bracket 31 carried by the stationary bearing 32 through which the valve rod 15 is projected. Lever 28 is held in engagement with pin 27 by means of a spring 33, and the governor balls are normally drawn together by one or more springs 34. To this extent my apparatus is of a common form.

Spring 33 operates upon lever 28 so as to hold it in engagement with pin 27 no matter what the position of that pin may be, and the governing speed of the governor balls 25 might be varied by an adjustment of this spring 33 upon lever 28, but I have found in practice that an attempt to vary the speed of the engine by such an adjustment is not desirable because it varies the amount of wear of pin 27 upon lever 28 and, as this particular device is designed primarily for use upon very cheap engines, lever 28 is commonly made of cast iron and incapable of withstanding great wearing pressures. I therefore plan that the resistance of lever 28 to movement caused by axial projection of pin 27 shall be very light and uniform but, as the springs 33 gradually deteriorate in strength, it is essential that an adjustable abutment screw 35 be provided for this spring so as to compensate for this gradual weakening of spring 33.

It has heretofore been common to so form the end of the lever 28 as to coöperate with the catch block 18 of rod 15 but such construction is open to a number of objections and it is to overcome these objections that my present construction has been provided. I axially extend the hub of lever 28, as shown in Fig. 2, and provide this extended hub with a flat seat 41 upon which I secure a spring finger 42, said spring being provided with two slots 43 through which the fastening screws 44 are passed. The lengthwise position of the spring finger 42 may be accurately determined by means of a temper screw 45 carried by lever 28 and bearing against the rear end of the finger. The forward end of lever 28 is turned to one side, as indicated in Fig. 2, so as to overlie the free end of finger 42, and projected through this overlying portion of lever 28 is an adjusting screw 46 which is provided with a hand wheel 47. The adjusting screw 46 engages the free end of finger 42 and thus determines the position of this finger, relative to the stop block 18, transversely of the line of movement of the stop block, and thus increases or diminishes the necessary travel of the finger before it can be projected into the line of movement of the stop block by the action of the governor, this being done without affecting in any manner the springs which fundamentally control the speed operation of the governor. The finger 42 is made of spring metal, and, as it is comparatively light, a very high grade of material may be used without materially increasing the expense of the structure as a whole.

By this construction, very great accuracy of governing can be attained, without any material increase in cost of production. The hand wheel 47 being readily accessible, the governing speed of the engine may be readily varied without stopping the engine.

It is desirable that there be no rotation of the pin 27 within sleeve 22 and in order to accomplish this result, one end of the pin is milled or notched at 51 so as to form a thin diametrical web or finger 52 which lies between the adjacent arms 26 of the two governing balls and is thus held by said arms against rotation.

In the smaller sizes the spring 42 may be too short to permit ready adjustment and in that case I provide the construction shown in Fig. 4, in which a short tube or sleeve 61 is journaled upon pin 29. Journaled upon tube 61 is an arm 28' corresponding with arm 28 and provided with a corresponding adjusting screw 46'. The finger 42', instead of being a spring finger like finger 42, is a rigid finger journaled upon sleeve 61 and connected to arm 28 by a coil spring 62 which continually holds the finger 42' in engagement with the adjusting screw 46'.

I claim as my invention:

1. The combination of a reciprocable valve rod, means for reciprocating said rod, a speed controlled governor, a lever acted upon by a member of said speed controlled governor, a stop block carried by the reciprocable valve rod, a spring finger carried by said lever and adapted to coöperate with said stop block, and an adjusting screw carried by said lever and forming an adjustable abutment for the free end of said spring finger, whereby it may be adjusted toward and from the line of travel of the stop block, all combined and arranged substantially as and for the purpose set forth.

2. The combination of a reciprocable valve rod, means for reciprocating said rod, a stop block carried by said rod, a rotary governor sleeve, a pair of governor balls pivoted upon said sleeve upon axes substantially at right angles to the axis of rotation of the sleeve, a pin projected through the sleeve and axially movable therein, said sleeve having a pair of notches formed in one end flanking an intermediate diametrical finger, the adjacent arms of the governor balls resting in said notches, a lever arranged adjacent the valve rod and having one end in engagement with one end of the governor pin, a spring acting upon said lever to hold it in engagement with the governor pin, a spring finger carried by said lever, means by which said spring finger may be adjusted lengthwise upon said lever, and an adjusting screw carried by said lever and engaging the free end of said spring finger to adjust the same toward and from the line of movement of the stop block, all combined and arranged substantially as and for the purpose set forth.

3. The combination of a reciprocable valve rod, means for reciprocating said rod, a stop block carried by said rod, a rotary governor sleeve, a pair of governor balls pivoted upon said sleeve upon axes substantially at right angles to the axis of rotation of the sleeve, a pin projected through the sleeve and axially movable therein, said sleeve having a pair of notches formed in one end flanking an intermediate diametrical finger, the adjacent arms of the governor balls resting in said notches, a lever arranged adjacent the valve rod and having one end in engagement with one end of the governor pin, a spring acting upon said lever to hold it in engagement with the governor pin, a spring finger carried by said lever, and an adjusting screw carried by said lever and engaging the free end of said spring finger to adjust the same toward and from the line of movement of the stop block, all combined and arranged substantially as and for the purpose set forth.

In witness whereof, I have hereunto set my hand and seal at Indianapolis, Indiana, this 6th day of March.

MILTON O. REEVES. [L. S.]

Witnesses:
ARTHUR M. HOOD,
FRANK A. FAHLE.